United States Patent
Chandra et al.

(10) Patent No.: US 10,747,776 B2
(45) Date of Patent: *Aug. 18, 2020

(54) REPLICATION CONTROL USING EVENTUALLY CONSISTENT META-DATA

(71) Applicant: International Business Machines Corporation, Armonk, NY (US)

(72) Inventors: Venkat K. Chandra, Andover, MA (US); Prasad G. Parulekar, Wayland, MA (US); Sunil Sarin, Newton, MA (US); Krishnan Seetharaman, Shrewsbury, MA (US); David L. Shepard, Sterling, MA (US); Lawrence Stabile, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 992 days.

This patent is subject to a terminal disclaimer.

(21) Appl. No.: 13/693,393

(22) Filed: Dec. 4, 2012

(65) Prior Publication Data
US 2014/0156596 A1  Jun. 5, 2014

(51) Int. Cl.
G06F 16/00 (2019.01)
G06F 16/27 (2019.01)

(52) U.S. Cl.
CPC .................... *G06F 16/27* (2019.01)

(58) Field of Classification Search
CPC ................... G06F 17/30575; G06F 16/27
See application file for complete search history.

(56) References Cited

U.S. PATENT DOCUMENTS

| | | | | |
|---|---|---|---|---|
| 5,787,247 | A | * | 7/1998 | Norin et al. .................. 709/220 |
| 6,324,571 | B1 | * | 11/2001 | Hacherl ................. G06F 9/468 |
| | | | | 707/999.1 |
| 7,653,652 | B2 | * | 1/2010 | Kagalwala et al. ... 707/999.103 |
| 8,719,225 | B1 | * | 5/2014 | Rath ............................ 707/634 |

(Continued)

FOREIGN PATENT DOCUMENTS

| | | |
|---|---|---|
| CN | 1534518 A | 10/2004 |
| CN | 101059807 | 10/2007 |
| WO | 2014087287 A1 | 6/2014 |

OTHER PUBLICATIONS

Shi Lu et al. Untangling Cluster Management With Helix, Oct. 14-17, 2012, ACM, all pages.*

(Continued)

*Primary Examiner* — Taelor Kim
*Assistant Examiner* — Lahcen Ennaji
(74) *Attorney, Agent, or Firm* — William H. Hartwell

(57) ABSTRACT

The present invention provides a method, system and computer program product for replication control using eventually consistent meta-data. In an embodiment of the invention, a method for replication control using eventually consistent meta-data is provided. The method includes replicating data in a replication data processing system of nodes coupled to one another over a computer communications network. The method also includes replicating meta-data representing the state of the replication data processing system into a data structure of eventually consistent meta-data. Finally, the method includes managing the replication of the data according to the replicated meta-data.

12 Claims, 2 Drawing Sheets

(56) References Cited

U.S. PATENT DOCUMENTS

| | | | |
|---|---|---|---|
| 2003/0188218 A1* | 10/2003 | Lubbers | G06F 11/2058 714/5.11 |
| 2004/0193952 A1 | 9/2004 | Narayanan et al. | |
| 2005/0015413 A1 | 1/2005 | Teodosiu et al. | |
| 2005/0027542 A1* | 2/2005 | Bordawekar et al. | 705/1 |
| 2005/0125430 A1* | 6/2005 | Souder et al. | 707/100 |
| 2013/0263122 A1* | 10/2013 | Levijarvi | G06F 11/1415 718/1 |
| 2013/0290249 A1* | 10/2013 | Merriman et al. | 707/610 |
| 2014/0081907 A1* | 3/2014 | Tran et al. | 707/609 |

OTHER PUBLICATIONS

International Search Report and Written Opinion, International application No. PCT/IB2013/060246, Authorized officer Wang, Rong, dated Apr. 3, 2014, 8 pages.

* cited by examiner

REPLICATION CONTROL USING EVENTUALLY CONSISTENT META-DATA

BACKGROUND OF THE INVENTION

Field of the Invention

The present invention relates to database replication and more particularly to eventual consistency in database replication.

Description of the Related Art

Database replication refers to the frequent electronic copying of data from a database in one computing system to a database in another, so that data can be accessed from multiple computing systems and geographic locations in parallel and so that data processing can continue despite outages or disasters, natural or otherwise, at individual systems and locations. In a primary-backup (or master-slave) replication scheme, a single "master" replica processes all operations against the data and propagates either the operations or the resultant data changes to the other replicas, whereas in a multi-master replication scheme any replica may process an operation and propagates the operation or the data changes to the other replicas. In a master-slave replication scheme, the replication node that plays the role of master can change over time, especially to cope with the failure of the current master and provide disaster recovery.

A replicated database management system ensures that changes, additions, and deletions performed on the data at any given location are automatically reflected in the data stored at all the other locations. It is desirable in such a system that every user always sees data that is consistent with the data seen by all the other users. However, in many cases, absolute consistency is not possible for replicated systems—particularly in view of the "CAP" or Brewer's theorem which provides that in a distributed and replicated database system, one can only have at most two of the following three characteristics: (1) consistency in which all nodes in the cluster see exactly the same data at any point in time; (2) availability in that the failure of a node does not render the database inoperative; and (3) partition tolerance in that nodes still may function when communication with other groups of nodes becomes lost.

Eventual consistency is an approach to replicated database management that provides a compromise between strong consistency and weak (no guarantees) consistency. The core of the eventual consistency concept is that although copies or replicas of the database may not be consistent with each other at a point in time, the database copies eventually become consistent should all updates cease. That is, inconsistencies are transitory—eventually all nodes will receive the latest consistent updates. Reference is made to Werner Vogels, *Eventually Consistent*, in ACM Queue vol. 6, no. 6 (December 2008). Thus, in the context of replicated systems, eventual consistency provides that replicated data ultimately will be consistent after a period of time has elapsed across different data replicas.

BRIEF SUMMARY OF THE INVENTION

Embodiments of the present invention address deficiencies of the art in respect to replication meta-data management in replicated database systems and provide a novel and non-obvious method, system and computer program product for replication control using eventually consistent meta-data without requiring strict consistency. In one embodiment of the invention, a method for replication control using eventually consistent meta-data is provided. The method includes replicating data in a replication data processing system of nodes coupled to one another over a computer communications network. The method also includes replicating state information for the replication data processing system into a data structure of eventually consistent meta-data. Finally, the method includes managing the replication of the data according to the replicated meta-data.

In another embodiment of the invention, a replicated data processing system can be configured for replication control using eventually consistent meta-data. The system can include a host computing device with memory and at least one processor and a database of replicated data coupled to the host computing device. The system also can include a replication flow machine executing in the memory of the host computing device. The flow machine replicates the data in the database responsive to data in coupled nodes of the replicated data processing system. Finally, the system includes a replication controller configured for eventual consistency. The controller includes program code enabled upon execution in the memory of the host computing device to replicate state information for the replication data processing system into a data structure of eventually consistent meta-data, and to manage the replication flow machine according to the replicated meta-data.

In one aspect of the embodiment, a communication channel is provided that enables the replication flow machine at one node to transmit data operations or changes to other nodes, which in turn effect replication by applying the data operations or changes thereon. In another aspect of the embodiment, integrity constraints can be applied to the meta-data in the data structure to detect violations of integrity constraints in the meta-data. For instance, the constraints can include a prohibition against the meta-data providing for multiple nodes of the system acting in a master role.

As such, the replication controller manages the replication flow machine according to the replicated meta-data by directing a suspension of the replication of the data responsive to detecting an integrity constraint violation in the meta-data. Similarly, the replication controller can manage the replication flow machine according to the replicated meta-data by transmitting an alert to an administrator responsive to detecting an integrity constraint violation in the meta-data. The replication controller may also manage the replication flow machine according to the replicated meta-data by invoking an external administrative computer program responsive to detecting an integrity constraint violation in the meta-data.

In yet another aspect of the embodiment, the replication meta-data indicates whether associated nodes are in a master role or a slave role. To that end the replication controller manages the replication flow machine according to the replicated meta-data by either transmitting an alert to an administrator, or directing a suspension of the replication of the data, or an external administrative computer program responsive to detecting an integrity constraint violation in the meta-data relating to which of the nodes of the replicated data processing system are in a master role and which are in a slave role.

In even yet another aspect of the embodiment, the replication meta-data includes different time stamped rows describing the replication states of different ones of the nodes. Accordingly, the meta-data can be replicated by receiving a replicated form of stored state information and for each row in the stored meta-data, overwriting the row with a corresponding row from the replicated form of the stored state information when a time stamp of the corresponding row is more recent than a time stamp for the row to be overwritten.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for replication control using eventually consistent meta-data. In accordance with an embodiment of the invention, a replicated data processing system can be provided which includes different computing nodes arranged in a communicatively coupled manner over a computer communications network. Each of the computing nodes can include a replication flow machine responsible for replicating data throughout the system by replicating data manipulating directives or the changes resulting from such directives between the replication flow machines. Each of the computing nodes also can include a replication controller charged with managing a corresponding replication flow machine within a common node. Of import, each replication controller can replicate a meta-data data structure that can include meta-data indicative of an overall state of the system with other replication controllers in the system. In this regard, the data structure can include eventually consistent meta-data representing the replication state. The eventually consistent meta-data for a system may be inconsistent at one point in time, but eventually becomes consistent. To ensure eventual consistency of the data structure, the data structure can include a time stamp for each row of meta-data so that only a most recent row for the meta-data is applied.

Figure 1:
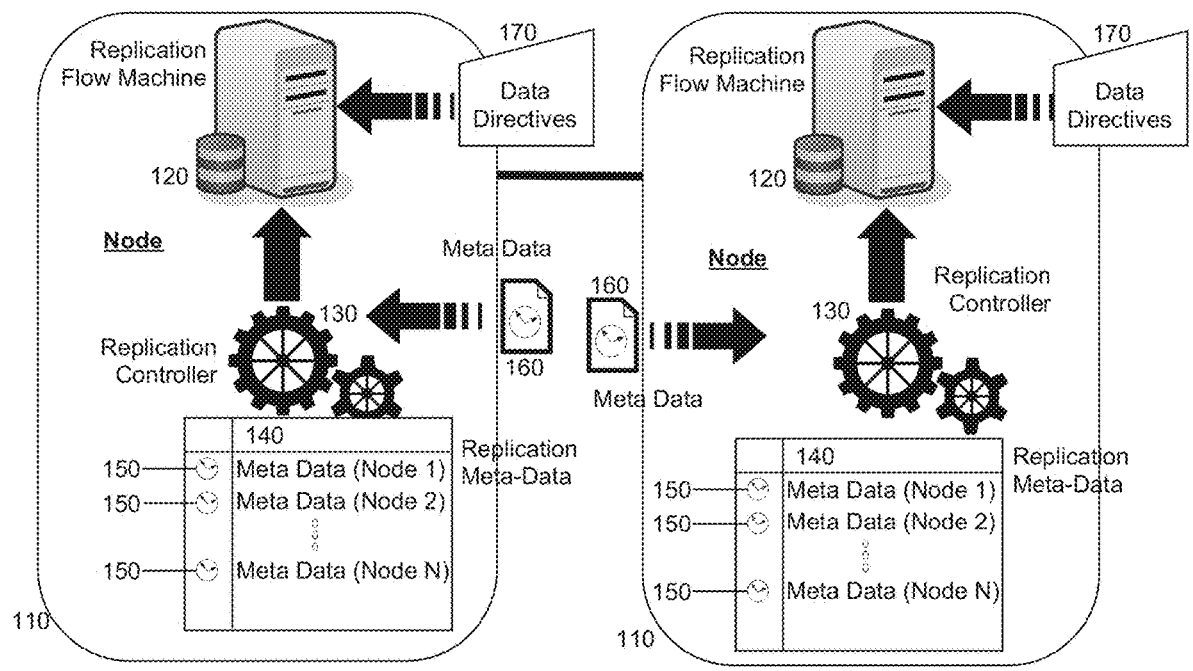
FIG. 1 is a pictorial illustration of a process for replication control using eventually consistent meta-data.

In further illustration, FIG. 1 is a pictorial illustration of a process for replication control using eventually consistent meta-data. As shown in FIG. 1, different nodes 110 of a replicated data processing system can replicate data through the operation of respectively different replication flow machines 120. Each of the replication flow machines 120 can exchange with others of the replication flow machines 120 data manipulation directives or data changes 170 against the data to be replicated amongst the nodes 110. A replication controller 130 further can be provided in each of the nodes 110 to manage the operation of a corresponding replication flow machine 120 in a common one of the nodes 110. The replication controller 130, for example can suspend and resume operation of a corresponding one of the replication flow machines 120, and the replication control 130 can publish reports or alerts to an administrator, for example by transmitting an e-mail message to an administrator.

Of note, each of the replication controllers 130 can replicate amongst one another meta-data stored in a coupled eventually consistent system meta-data table 140. Optionally, the meta-data can replicate at a rate greater than that of the replication flow machine 120 and the meta-data table 140 can include therein different rows for meta-data for different ones of the nodes 110 in the replicated system. In one aspect of the embodiment, each of the rows can include a time stamp 150. In this way, a replicated meta-data 160 is received in each of the nodes, the replication controller 130 can compare the time stamp of the replicated meta-data 160 with that of a matching row in the meta-data table 140 so that only the most recent version of the row is stored in the system meta-data table 140. Thereafter, the replication controller 130 can act upon the rows of the system meta-data table 140 to control the replication flow machine 120 even though the data in the system meta-data table 140 is not absolutely consistent, but merely eventually consistent.

Figure 2:
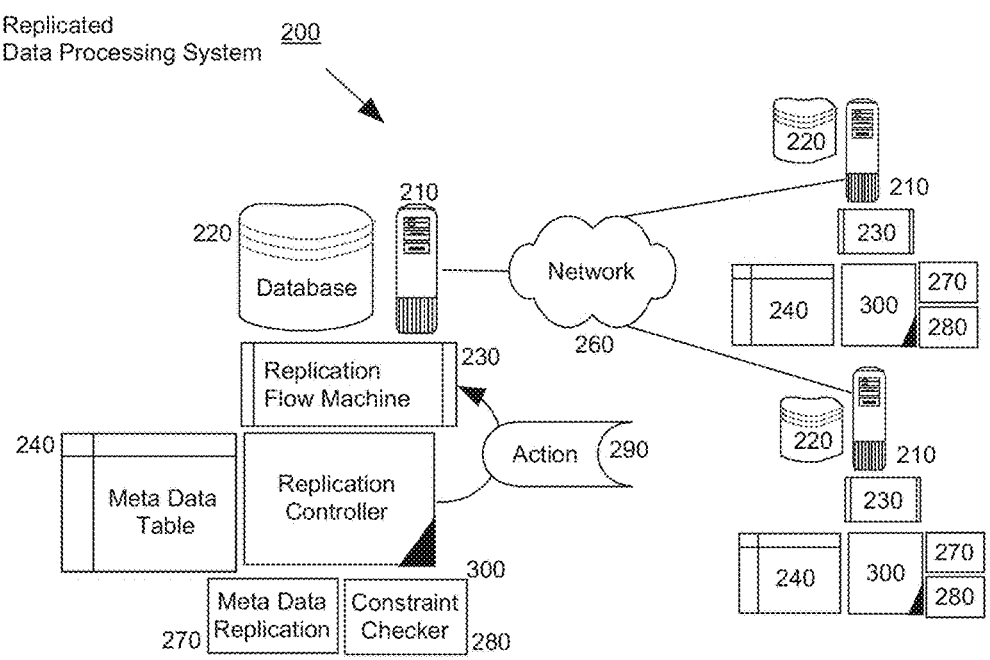
FIG. 2 is a schematic illustration of a replicated data processing system configured for replication control using eventually consistent meta-data; and, FIG. 3 is a flow chart illustrating a process for replication control using eventually consistent meta-data.

The process described in connection with FIG. 1 can be implemented within a replicated data processing system. In yet further illustration, FIG. 2 schematically shows a replicated data processing system configured for replication control using eventually consistent meta-data. As shown in FIG. 2, a replicated data processing system 200 can include different nodes each hosted by a computing device 210 coupled to one another over a computer communications network 260. Each of the computing devices 210 further can be coupled to a database 220 of data to be replicated amongst the nodes.

A replication flow manager 230 can execute in the memory of each of the computing devices 210 and can act to replicate data in the database 220 with data in others of the databases 220 of other nodes. The replication flow manager 230 at one replication node can transmit different data manipulation directives or changes resulting from such directives on data in the databases 220 over the computer communications network 260, so that when a given directive or change is retrieved by another of the nodes over the computer communications network 260, the replication flow manager 230 at that other node can apply the retrieved data manipulation directive or change to data in a corresponding one of the databases 220 to effect replication of the data in the corresponding one of the databases 220.

Of note, a replication controller 300 configured for eventual consistency can be provided in connection with the replication flow machine 230. The replication controller 300 can include a meta-data table 240 of different rows corresponding to different nodes in the system 200, each row providing meta-data for an associated node. By way of example, the meta-data can include a configuration of the associated node, such as whether or not the node is in a master role or a slave role. Each row in the meta-data table 240 further can include a corresponding time stamp (not shown) which can mark a time when the row was recorded. A constraint checker module 280 included as part of the replication controller 300 can process the meta-data table 240 in order to identify integrity constraint violations in the meta-data for the system 200 and can respond to the detection thereof by engaging in one or more actions 290 upon the replication flow machine 230, such as suspending the operation of the replication flow machine 230, or by transmitting an alert message to an administrator or by invoking an external administrative computer program. By way of example, one constraint can be a prohibition against multiple nodes simultaneously acting in the master role.

In accordance with an embodiment of the invention, a meta-data replication module 270 can be included as part of the replication controller 300. The meta-data replication module 270 can include program code that when executed in memory of a supporting one of the computing devices 210 can receive a replicated form of the meta-data table 240 and can synchronize the rows of the received replicated form of the meta-data table 240 with the rows of the meta-data table 240 utilized by the replication controller 300. Thereafter, only those rows of the meta-data table 240 that are stale in respect to corresponding rows in the replicated form of the meta-data table 240 as indicated by the time stamps for each, are replaced by the corresponding rows in the replicated form of the meta-data table 240 by the program code of the meta-data replication module 270.

Figure 3:
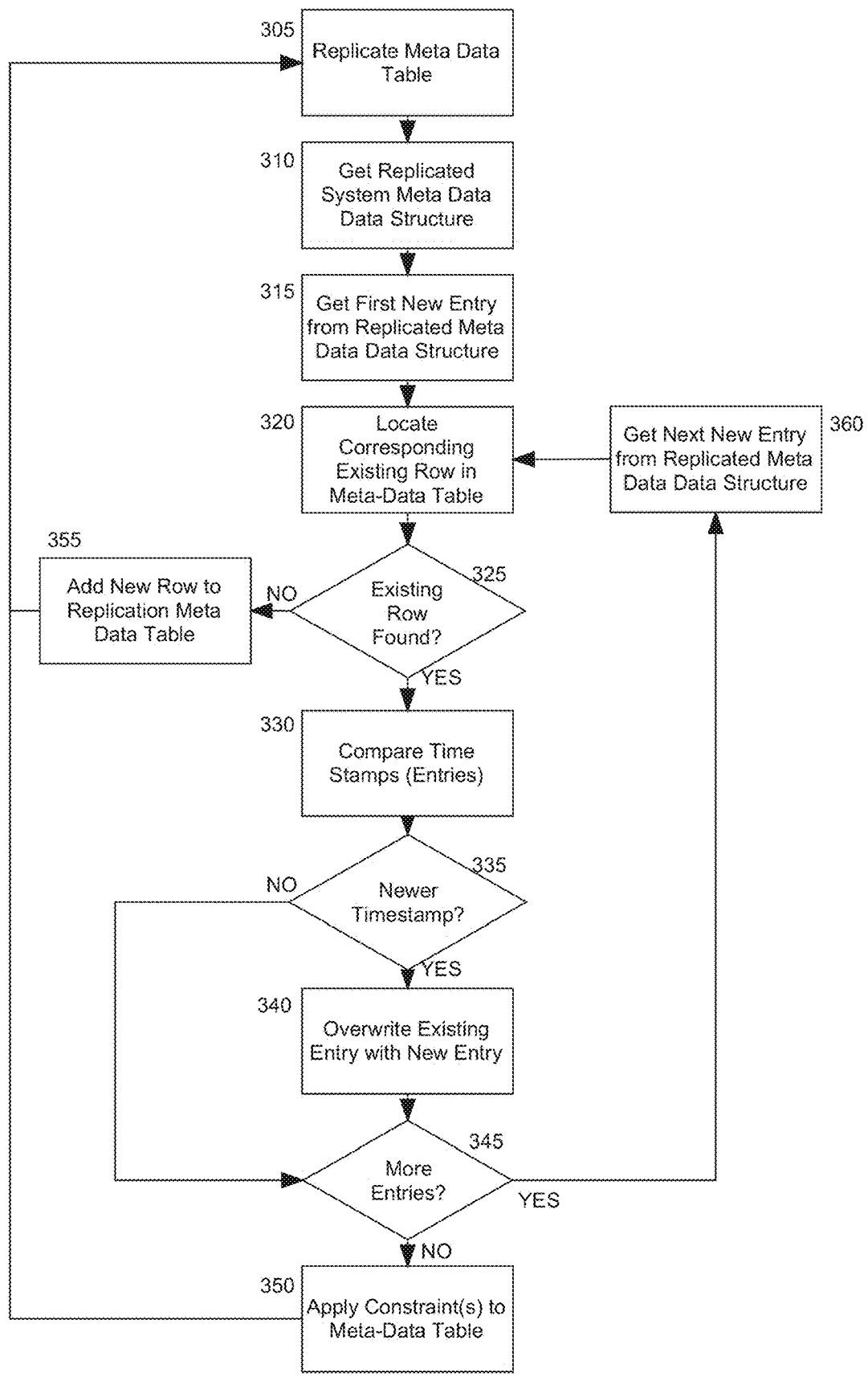

In even yet further illustration of the operation of the meta-data replication module 270 of the replication controller 300, FIG. 3 is a flow chart illustrating a process for replication control using eventually consistent meta-data. Beginning in block 305, a directive can issue within the replication controller to replicate the meta-data table. In block 310, a replicated form of the meta-data table can be received from another node and in block 315, a first row in the replicated form of the meta-data table associated with a particular node in the system can be retrieved for processing. Thereafter, in block 320 a corresponding row in the meta-data table can be located for the particular node and in decision block 325, it can be determined if an existing row exists for the particular node. If not, in block 355 a new row can be added to the meta-data table for the particular node. Otherwise, in block 330 the time stamps of both rows can be compared.

In decision block 335, it can be determined whether or not the time stamp of the row in the replicated form of the meta-data table is more recent than that of the corresponding row in the meta-data table itself. If so, in block 340 the corresponding row in the meta-data table can be overwritten with the row from the replicated form of the meta-data table. Subsequently, in decision block 345 it can be determined whether or not additional rows remain to be processed in the replicated form of the meta-data table. If so, the process can branch to block 360 in which a next row in the replicated form of the meta-data table can be retrieved for process. As such, the process can repeat through block 320. In decision block 345, however, when no further rows in the replicated form of the meta-data table remain to be processed, in block 350 one or more constraints can be applied to the meta-data table to determine what if any action are to be performed upon the replication flow machine.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A replicated data processing system configured for replication control using eventually consistent meta-data, the system comprising a plurality of replication nodes, each of which comprising:
   a host computing device with memory and at least one processor;
   a database of replicated data coupled to the host computing device;
   a replication flow machine executing in the memory of the host computing device, the flow machine replicating the data in the database responsive to data modifications in coupled nodes of the replicated data processing system at a first replication rate; and
   a replication controller configured for eventual consistency, the controller comprising program code enabled upon execution in the memory of the host computing device to:
      replicate meta-data representing a state of the replication data processing system, at a second replication rate which is greater than the first replication rate of the data, into a data structure of eventually consistent meta-data organized into rows of a table, the rows representing a state of all replication nodes in the system and each of the rows having an associated timestamp representing a time of last modification, the state of the meta-data including whether a corresponding node is in a master role processing all operations against the data and propagating either the operations or the resultant data changes to others of the nodes, or the corresponding node is in a slave role receiving either the operations or the resultant data changes from a master one of the nodes;
      compare a time stamp of the replicated meta-data with that of a matching row in the meta-data table so that only a most recent version of the row is stored in the table;
      apply an integrity constraint to the meta-data of the data structure of eventually consistent meta-data, the constraint constraining the meta-data in the data structure to only meta-data that prohibits multiple nodes of the replication data processing system from acting in a master role with exclusive permission to modify the replicated data so that meta-data in the data structure permits only one of the nodes of the replication data processing system to modify the replicated data in the replication data processing system; and
      manage the replication flow machine according to the replicated meta-data.

2. The system of claim 1, wherein the state information in one of the nodes is replicated by receiving a replicated form of stored state information from another of the nodes and for each row in the stored state information, overwriting the row with a corresponding row from the received replicated form of the stored state information when a time stamp of the corresponding row is more recent than a time stamp for the row to be overwritten.

3. The system of claim 1, wherein the replication controller processes the replicated meta-data in the data structure to detect violations of integrity constraints in the meta-data.

4. The system of claim 3, wherein the replication controller manages the replication flow machine according to the replicated meta-data by directing a suspension of the replication of the data responsive to detecting an integrity constraint violation in the meta-data.

5. The system of claim 3, wherein the replication controller manages the replication flow machine according to the replicated meta-data by transmitting an alert to an administrator responsive to detecting an integrity constraint violation in the meta-data.

6. The system of claim 3, wherein the replication controller manages the replication flow machine according to the replicated meta-data by invoking an external administrative program responsive to detecting an integrity constraint violation in the meta-data.

7. A computer program product for replication control using eventually consistent meta-data, the computer program product comprising:
  a computer readable storage memory device having computer readable program code embodied therewith, the computer readable program code comprising:
  computer readable program code for replicating data in a replication data processing system of nodes coupled to one another over a computer communications network at a first replication rate;
  computer readable program code for replicating meta-data representing a state of the replication data processing system, at a second replication rate which is greater than the first replication rate of the data, into a data structure of eventually consistent meta-data organized into rows of a table, the rows representing a state of all replication nodes in the system and each of the rows has an associated timestamp representing a time of last modification, the state of the meta-data including whether a corresponding node is in a master role processing all operations against the data and propagating either the operations or the resultant data changes to others of the nodes, or the corresponding node is in a slave role receiving either the operations or the resultant data changes from a master one of the nodes;
  computer readable program code for comparing a time stamp of the replicated meta-data with that of a matching row in the meta-data table so that only a most recent version of the row is stored in the table;
  computer readable program code for applying an integrity constraint to the meta-data of the data structure of eventually consistent meta-data, the constraint constraining the meta-data in the data structure to only meta-data that prohibits multiple nodes of the replication data processing system from acting in the master role with exclusive permission to modify the replicated data so that meta-data in the data structure permits only one of the nodes of the replication data processing system to modify the replicated data in the replication data processing system; and, computer readable program code for managing the replication of the data according to the replicated meta-data.

8. The computer program product of claim 7, wherein the meta-data in one of the nodes is replicated by receiving a replicated form of stored meta-data from another of the nodes and for each row in the stored meta-data, overwriting the row with a corresponding row from the received replicated form of the stored meta-data when a time stamp of the corresponding row is more recent than a time stamp for the row to be overwritten.

9. The computer program product of claim 7, further comprising computer readable program code for processing the meta-data in the data structure to detect violations of integrity constraints in the meta-data.

10. The computer program product of claim 9, wherein the replication of the data is managed according to the replicated meta-data by directing a suspension of the replication of the data responsive to detecting an integrity constraint violation in the meta-data.

11. The computer program product of claim 9, wherein the replication of the data is managed according to the replicated meta-data by transmitting an alert to an administrator responsive to detecting an integrity constraint violation in the meta-data.

12. The computer program product of claim 9, wherein the replication of the data is managed by invoking an external administrative computer program responsive to detecting an integrity constraint violation in the meta-data.

* * * * *